United States Patent
Luo

(10) Patent No.: US 11,345,536 B2
(45) Date of Patent: May 31, 2022

(54) LARGE SIZE THERMAL BAG AND A METHOD OF MANUFACTURING THE SAME

(71) Applicant: Quanzhou Xinheng Outdoor Equipment Co., Ltd., Fujian (CN)

(72) Inventor: Binghua Luo, Fujian (CN)

(*) Notice: Subject to any disclaimer, the term of this patent is extended or adjusted under 35 U.S.C. 154(b) by 162 days.

(21) Appl. No.: 16/655,233

(22) Filed: Oct. 17, 2019

(65) Prior Publication Data

US 2021/0032008 A1 Feb. 4, 2021

(30) Foreign Application Priority Data

Jul. 30, 2019 (CN) .......................... 201910692680.0

(51) Int. Cl.
  *B65D 81/38* (2006.01)
  *F16L 59/02* (2006.01)

(52) U.S. Cl.
  CPC ........ *B65D 81/3897* (2013.01); *F16L 59/028* (2013.01)

(58) Field of Classification Search
  CPC ............ B65D 81/3897; B65D 81/3886; B65D 81/3874; B65D 81/3858

USPC .......................................................... 383/37
See application file for complete search history.

(56) References Cited

U.S. PATENT DOCUMENTS

| | | | | |
|---|---|---|---|---|
| 4,598,746 | A * | 7/1986 | Rabinowitz | A45C 11/20 |
| | | | | 206/545 |
| 6,244,458 | B1 * | 6/2001 | Frysinger | B65D 81/3823 |
| | | | | 220/592.09 |
| 2004/0035143 | A1 * | 2/2004 | Mogil | A45C 7/0077 |
| | | | | 62/457.2 |
| 2007/0237432 | A1 * | 10/2007 | Mogil | A45C 7/0077 |
| | | | | 383/38 |
| 2017/0071304 | A1 * | 3/2017 | Wang | A45C 13/008 |
| 2017/0119116 | A1 * | 5/2017 | Bradley | A45C 11/20 |
| 2018/0229911 | A1 * | 8/2018 | Luo | B65D 81/3818 |

* cited by examiner

*Primary Examiner* — Derek J Battisti
(74) *Attorney, Agent, or Firm* — Prakash Nama; Global IP Services, PLLC

(57) ABSTRACT

A manufacturing method of a large size thermal bag, having the steps of a) manufacturing a cover which includes an outer cover and an inner cover; b) manufacturing an inner bag; c) manufacturing an outer bag; d) disposing a layer of insulation material between the inner bag and the outer bag; e) welding the inner bag to a lower surface of the outer cover. Also provided is the large size thermal bag having an inwardly recessed cavity.

3 Claims, 6 Drawing Sheets

LARGE SIZE THERMAL BAG AND A METHOD OF MANUFACTURING THE SAME

BACKGROUND OF THE INVENTION

The present invention relates to a method of manufacturing a large size thermal bag and the thermal bag being manufactured according to said method. The thermal bag can be used in different technical fields such as cold chain logistics, freshness preservation of food products, thermal insulation and constant temperature storage.

There are two types of thermal bag, hard and soft. A soft thermal bag generally comprises a bag body and a cover movably connected with each other. The bag body comprises an inner bag, an outer bag and an insulation layer. The inner bag has an upper opening and a cavity of a certain capacity. The outer bag also has an upper opening and a cavity larger than the inner bag. The insulation layer is positioned between the inner bag and the outer bag to achieve insulation and temperature maintenance between the inner bag and the outer bag. The insulation layer has a front side wall, a rear side wall, a left side wall, a right side wall and a bottom side wall integrally connected. The cover is made up of an upper cover, a lower cover and an insulation material layer; outer side walls of the upper cover and the lower cover are fixedly connected, and the insulation material layer is positioned in between the upper cover and the lower cover. In general, the bag body and the cover are removably connected via zippers or buckles.

A prior art method of manufacturing a thermal bag, as disclosed by the Applicant in a prior art CN106241056B, comprises the following steps:
 a. preparing a cover of the thermal bag;
 b. preparing an inner bag of the thermal bag;
 c. preparing an outer bag of the thermal bag;
 d. sleeving an insulation layer onto the inner bag, and then placing the inner bag together with the insulation layer into the outer bag; and welding an upper periphery of the inner bag with the outer bag;
 e. fixing a relative position between the cover and an upper periphery of the outer bag via adhesives, and then welding the cover to the upper periphery of the outer bag, to obtain the thermal bag.

Step b specifically comprises the following steps:
 b1. a rectangular thermoplastic material is opened with a zipper groove along its lengthwise direction, and then the two longitudinal side edges thereof are welded to form an outer peripheral surface of the inner bag; the outer peripheral surface of the inner bag has a peripheral upper edge piece located above the zipper groove and a peripheral lower edge piece located below the zipper groove;
 b2. the outer peripheral surface of the inner bag passes through an inner side of a first mold, and the peripheral lower edge piece is folded outward on an outer side of the first mold; an inner bag top piece is placed on the peripheral lower edge piece and weld the inner bag top piece with the peripheral lower edge piece together;
 b3. welding two longitudinal side edges of another rectangular thermoplastic material together to form an inner peripheral surface of the inner bag of the thermal bag;
 b4, the inner peripheral surface of the inner bag passes through an inner side of a second mold, and folds outward on an outer side of the second mold, and the inner bag top piece of the semi-finished product in step b2 is welded with the inner peripheral surface, wherein the peripheral lower edge piece and the inner peripheral surface are located on the same side of the inner bag top piece;
 b5, a portion of the inner bag top piece of the semi-finished product obtained in step b4 covered by the inner peripheral surface is cut off;
 b6, a piece of thermoplastic material is covered on and welded with a lower edge of the inner peripheral surface of the semi-finished product obtained in step b5, to obtain the inner bag of the thermal bag.

Step a and step c belong to prior art.

The thermal bag according to the above prior art manufacturing method requires ice bags to be placed inside the cavity to create cooling effect proactively. However, this way of creating cooling effect occupies the space of the cavity.

BRIEF SUMMARY OF THE INVENTION

In view of the aforesaid disadvantages now present in the prior art, the present invention provides a large size thermal bag and a method of manufacturing the same. An object of the invention is to solve the problem of reduced capacity of the thermal bag after adding in heating or cooling medium.

To fulfill the above object, the present invention has the following technical solution:

A method of manufacturing a large size thermal bag, comprising the following steps:
 a. manufacturing a cover for the thermal bag, wherein the cover comprises an outer cover and an inner cover;
 b. manufacturing an inner bag, wherein the inner bag comprises an upper peripheral piece above a zipper groove and a lower peripheral piece below the zipper groove;
 c. manufacturing an outer bag;
 d. disposing a layer of first insulation material between the outer bag and the inner bag; and welding upper peripheral edges of the inner bag to the outer bag;
 e. disposing the outer cover obtained in step a in the outer bag of step d wherein the outer cover is bound by interior sides of the outer bag; welding the upper peripheral piece to a lower surface of the outer cover to form an integral structure;
 f. folding upper peripheral edges of the outer bag inwardly and downwardly to be welded to outer peripheral edges of a thermoplastic surface material on an upper surface of the outer cover to form an integral structure;
 g. welding the inner cover obtained in step a to a lower surface of the upper peripheral piece so as to be fixedly connected integrally with the outer cover, thereby obtaining the thermal bag.

Manufacturing of the inner cover of step a comprises the following steps:
 a4. welding two longitudinal side edges of a first rectangular thermoplastic surface material together to form an inner cover inner enclosing component;
 a5. welding upper peripheral edges of the inner cover inner enclosing component to an inner cover upper plate; and welding lower peripheral edges of the inner cover inner enclosing component to an inner cover lower plate;
 a6. welding two longitudinal side edges of a second rectangular thermoplastic surface material together to form an inner cover peripheral component;
 a7. welding lower peripheral edges of the inner cover peripheral component obtained in step a6 to outer peripheral edges of the inner cover lower plate to form an integral structure;
 a8. cutting away portions of the inner cover lower plate which are interior to welding seams between the inner cover inner enclosing component and the inner cover lower plate, so as to form a cavity inwardly recessed towards the inner cover to accommodate a heating or cooling medium;

a9. after step a8, filling in a second insulation material between the inner cover peripheral component and the inner cover inner enclosing component.

Preferably, manufacturing of the outer cover of step a comprises the following steps:

a1. fixedly connecting a first thermoplastic surface material and a reinforcing plate together to form an integral structure, wherein a thickness of the reinforcing plate around a periphery thereof is less than 3.0 mm;

a2. fixedly connecting a layer of second thermoplastic material to a lower surface of the reinforcing plate.

Preferably, there is an additional step between step a8 and step a9: one end of each of at least one pair of fastening strips are welded to opposite inner sides of the inner cover inner enclosing component respectively; free ends of the two fastening strips of each pair are provided with fastening loops and fastening hooks (Velcro® tape) respectively; there are one to three pairs of fastening strips.

Preferably, in said step a5, welding of the upper peripheral edges of the inner cover inner enclosing component to the inner cover upper plate and welding of the lower peripheral edges of the inner cover inner enclosing component to the inner cover lower plate are performed simultaneously.

Preferably, said step a8 is performed after step a5 or step a6.

Preferably, said steps a4 to a9 of manufacturing the inner cover in step a are replaced by steps a10 to a16 as follows:

a10. welding two longitudinal side edges of a first rectangular thermoplastic surface material together to form an inner cover peripheral component;

a11. welding lower peripheral edges of the inner cover peripheral component obtained in step a10 to an inner cover lower plate;

a12. welding two longitudinal side edges of a second rectangular thermoplastic surface material together to form an inner cover inner enclosing component;

a13. welding lower peripheral edges of the inner cover inner enclosing component to an interior portion of the inner cover lower plate of step a11 interior to a boundary of the inner cover lower plate, so that the inner cover lower plate and the inner cover inner enclosing component form an integral structure;

a14. welding upper peripheral edges of the inner cover inner enclosing component to an inner cover upper plate;

a15. cutting away portions of the inner cover lower plate which are interior to welding seams between the inner cover inner enclosing component and the inner cover lower plate, so as to form a cavity inwardly recessed towards the inner cover to accommodate a heating or cooling medium;

a16. after step a15, filling in a second insulation material between the inner cover peripheral component and the inner cover inner enclosing component.

Preferably, the reinforcing plate of step a1 is an ethylene-vinyl acetate (EVA) plate.

Another manufacturing method of a large size thermal bag is disclosed, comprising the following steps:

a. manufacturing a cover for the thermal bag, wherein the cover comprises an outer cover and an inner cover;

b. manufacturing an inner bag, wherein the inner bag comprises an upper peripheral piece above a zipper groove and a lower peripheral piece below the zipper groove;

c. manufacturing an outer bag;

d. disposing a layer of first insulation material between the outer bag and the inner bag; and welding upper peripheral edges of the inner bag to the outer bag;

h. fixedly connecting inner peripheral edges of the upper peripheral piece to outer peripheral edges of a second thermoplastic surface material;

i. fixedly connecting the outer cover obtained in step a to the second thermoplastic surface material of step h or the upper peripheral piece; wherein the outer cover obtained in step a comprises a first thermoplastic surface material and an ethylene-vinyl acetate (EVA) plate fixedly connected to a bottom surface of the first thermoplastic surface material;

j. welding the outer peripheral edges of the upper peripheral piece to the outer bag obtained in step c to form an integral structure;

k. folding upper peripheral edges of the outer bag inwardly and downwardly to be welded to outer peripheral edges of the first thermoplastic surface material on an upper surface of the outer cover to form an integral structure;

l. welding the inner cover obtained in step a to a lower surface of the upper peripheral piece or a lower surface of the second thermoplastic surface material so as to be connected integrally with the outer cover, thereby obtaining the thermal bag;

manufacturing of the inner cover in step a comprises the following steps:

a4. welding two longitudinal side edges of a first rectangular thermoplastic surface material together to form an inner cover inner enclosing component;

a5. welding upper peripheral edges of the inner cover inner enclosing component to an inner cover upper plate; and welding lower peripheral edges of the inner cover inner enclosing component to an inner cover lower plate;

a6. welding two longitudinal side edges of a second rectangular thermoplastic surface material together to form an inner cover peripheral component;

a7. welding lower peripheral edges of the inner cover peripheral component obtained in step a6 to outer peripheral edges of the inner cover lower plate to form an integral structure;

a8. cutting away portions of the inner cover lower plate which are interior to welding seams between the inner cover inner enclosing component and the inner cover lower plate, so as to form a cavity inwardly recessed towards the inner cover to accommodate a heating or cooling medium;

a9. after step a8, filling in a second insulation material between the inner cover peripheral component and the inner cover inner enclosing component.

Preferably, said steps a4 to a9 of manufacturing the inner cover obtained in step a are replaced by the following steps a10 to a16:

a10. welding two longitudinal side edges of a first rectangular thermoplastic surface material together to form an inner cover peripheral component;

a11. welding lower peripheral edges of the inner cover peripheral component obtained in step a10 to an inner cover lower plate;

a12. welding two longitudinal side edges of a second rectangular thermoplastic surface material together to form an inner cover inner enclosing component;

a13. welding lower peripheral edges of the inner cover inner enclosing component to an interior portion of the inner cover lower plate of step a11 interior to a boundary of the inner cover lower plate, so that the inner cover lower plate and the inner cover inner enclosing component form an integral structure;

a14. welding upper peripheral edges of the inner cover inner enclosing component to an inner cover upper plate;

a15. cutting away portions of the inner cover lower plate which are interior to welding seams between the inner cover inner enclosing component and the inner cover lower plate, so as to form a cavity inwardly recessed towards the inner cover to accommodate a heating or cooling medium;

a16. after step a15, filling in a second insulation material between the inner cover peripheral component and the inner cover inner enclosing component.

A large size thermal bag manufactured according to the method described above, comprising an outer bag, an inner bag and a cover; the inner bag is mounted with a lower peripheral piece and an upper peripheral piece; the lower peripheral piece is welded to the outer bag to form an integral structure; a layer of first insulation material is filled between the outer bag and the inner bag; the cover comprises an outer cover and an inner cover; the inner cover comprises an inner cover inner enclosing component, an inner cover upper plate, an inner cover lower plate, an inner cover peripheral component and a layer of second insulation material; the inner cover lower plate is a strip of material having a shape of a closed loop ring; lower peripheral edges of the inner cover inner enclosing component are fixedly connected to an inner peripheral edges of the inner cover lower plate; lower peripheral edges of the inner cover peripheral component are fixedly connected to outer peripheral edges of the inner cover lower plate; a lower surface of the inner cover upper plate is fixedly connected to upper peripheral edges of the inner cover inner enclosing component, so that a middle part of the inner cover has a cavity recessed inwardly towards the inner cover; the second insulation material is provided between the inner cover inner enclosing component and the inner cover peripheral component; the upper peripheral piece is fixedly connected to a lower surface of the outer cover; upper peripheral edges of the inner cover peripheral component are fixedly connected to a lower surface of the upper peripheral piece or the lower surface of the outer cover; upper peripheral edges of the outer bag are folded inwardly and downwardly to be welded to an upper surface of the outer cover.

Preferably, the outer cover comprises stacked layers from top to bottom, a first thermoplastic surface material, a reinforcing plate and a second thermoplastic surface material, fixedly connected to one another; the upper peripheral piece is welded to the second thermoplastic surface material to form an integral structure; the upper peripheral edges of the outer bag are folded inwardly and downwardly to be welded to the first thermoplastic surface material to form the integral structure; the upper peripheral edges of the inner cover peripheral component are welded to a lower surface of the upper peripheral piece or a lower surface of the second thermoplastic surface material.

Preferably, the reinforcing plate is an ethylene-vinyl acetate (EVA) plate; also, a thickness of the EVA plate around its periphery is less than 3.0 mm.

In accordance with the technical solutions described above, the present invention has the following beneficial effects:

The present invention is provided with a cover having a cavity recessed inwardly towards the inner cover, thereby increasing the capacity of a conventional thermal bag and thus the loads it can carry. The cavity can accommodate proactive heating or cooling medium, and therefore such heating or cooling medium will not occupy the original space intended for item storage in a conventional thermal bag, thereby leaving the original space for item storage unaffected. Also, a specialized storage box can be used to suit into the cavity without occupying the original space for item storage in the thermal bag. Further, due to structural effect of a zipper, the inner cover and the inner bag will press against each other, thereby enhancing the performance of the thermal bag in terms of temperature maintenance.

With respect to the manufacturing method of the thermal bag, the cover, the inner bag and the outer bag of the present invention can be manufactured separately but simultaneously, thereby minimizing the limitation on production and increasing the assembly efficiency of the separately manufactured parts. The cover of the thermal bag is divided to an outer cover and an inner cover, the outer cover can increase the overall mechanical strength of the thermal bag, while the inner cover serves the function of maintaining temperature. Further, the steps of manufacturing the inwardly recessed cavity for accommodating heating or cooling medium are versatile in accordance with different product requirements, where welding operation can be easily controlled in which the inner cover upper plate and the inner cover lower plate can be performed in sequential order or performed simultaneously.

DETAILED DESCRIPTION OF THE INVENTION

Figure 1:
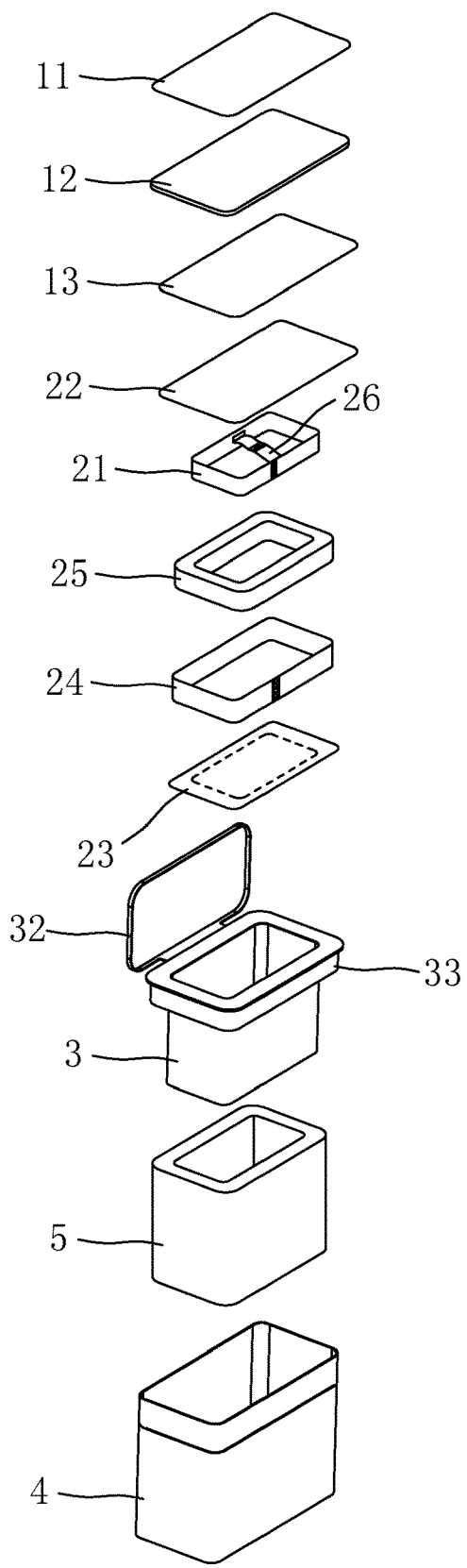
FIG. 1 is an exploded structural view of the present invention according to embodiment 1.

The present invention will be further described in detail below with reference to some embodiments, so as to enable thorough understanding of how technical means are to be employed to solve relevant technical problems and of the process through which the present invention achieves its technical effect, in order that the present invention can be implemented accordingly.

Embodiment 1

With reference to FIGS. 1-4, a manufacturing method of a large size thermal bag is disclosed, comprising the following steps:

a. manufacturing a cover 100 for the thermal bag, wherein the cover 100 comprises an outer cover 1 and an inner cover 2;

b. manufacturing an inner bag 3, wherein the inner bag comprises an upper peripheral piece 32 above a zipper groove 31 and a lower peripheral piece 33 below the zipper groove 31;

c. manufacturing an outer bag 4, wherein manufacturing methods of the inner bag 3 and the outer bag 4 are the methods disclosed in CN106800142A; for example, the background section of CN106800142A disclosed a method of making an outer bag, and this method is known in the prior art; the specific method steps thereof can be known from CN106241056B as mentioned in the Background of the present invention, wherein a rectangular TPU surface material is used as the enclosure material of the outer bag, and the enclosure material is processed to form a zipper groove; a first zipper tape having first zipper teeth is welded to a first side of the zipper groove, a second zipper tape having second zipper teeth is welded to a second side of the zipper groove; and two longitudinal sides of the rectangular enclosure material are welded together; and then a bottom piece of the outer bag is glued and fixed in position and then subsequently welded to a lower periphery of the rectangular enclosure material formed by welding the two longitudinal sides thereof, thereby forming the outer bag.

d. disposing a layer of first insulation material 5 between the outer bag 4 and the inner bag 3; and welding upper peripheral edges of the inner bag 3 to the outer bag 4;

e. disposing the outer cover 1 obtained in step a in the outer bag 4 of step d wherein the outer cover 1 is bound by interior sides of the outer bag 4; welding the upper peripheral piece 32 to a lower surface of the outer cover 1 to form an integral structure;

f. folding upper peripheral edges of the outer bag 4 inwardly and downwardly to be welded to outer peripheral edges of a thermoplastic surface material on an upper surface of the outer cover 1 to form an integral structure;

g. welding the inner cover 2 obtained in step a to a lower surface of the upper peripheral piece 32 so as to be fixedly connected integrally with the outer cover 1, thereby obtaining the thermal bag.

Manufacturing of the inner cover 2 of step a comprises the following steps:

a4. welding two longitudinal side edges of a first rectangular thermoplastic surface material together to form an inner cover inner enclosing component 21;

a5. welding upper peripheral edges of the inner cover inner enclosing component 21 to an inner cover upper plate 22; and welding lower peripheral edges of the inner cover inner enclosing component 21 to an inner cover lower plate 23;

a6. welding two longitudinal side edges of a second rectangular thermoplastic surface material together to form an inner cover peripheral component 24;

a7. welding lower peripheral edges of the inner cover peripheral component 24 obtained in step a6 to outer peripheral edges of the inner cover lower plate 23 to form an integral structure;

a8. cutting away portions of the inner cover lower plate 23 which are interior to welding seams between the inner cover inner enclosing component 21 and the inner cover lower plate 23, so as to form a cavity 200 inwardly recessed towards the inner cover to accommodate a heating or cooling medium;

a9. after step a8, filling in a second insulation material 25 between the inner cover peripheral component 24 and the inner cover inner enclosing component 21.

Manufacturing of the outer cover 1 of step a comprises the following steps:

a1. fixedly connecting a first thermoplastic surface material 11 and a reinforcing plate 12 together to form an integral structure, wherein a thickness of the reinforcing plate 12 around a periphery thereof is less than 3.0 mm, and more specifically less than 1.0 mm; specifically, the reinforcing plate 12 is an EVA plate. If the reinforcing plate 12 is too thick at the periphery thereof, a stronger current has to be used during high frequency welding. Stronger current implies that the mold will be heated up significantly. As such, during welding of upper peripheral edges of the outer bag 4, the TPU surface material will be damaged by heat. During actual practice, the EVA plate can be pretreated such that its periphery is trimmed to have a thickness less than 1.5 mm, preferably around 1 mm;

a2. fixedly connecting a layer of second thermoplastic material 13 to a lower surface of the reinforcing plate 12.

The present embodiment also comprises the following step between step a8 and step a9: one end of each of at least one pair of fastening strips 26 are welded to opposite inner sides of the inner cover inner enclosing component 21 respectively; free ends of the two fastening strips are provided with fastening loops and fastening hooks (Velcro® tape) respectively; the fastening strips 26 fix the heating or cooling medium disposed into the cavity 200 recessed inwardly towards the inner cover.

In said step a5, welding of the upper peripheral edges of the inner cover inner enclosing component 21 to the inner cover upper plate 22 and welding of the lower peripheral edges of the inner cover inner enclosing component 21 to the inner cover lower plate 23 are performed simultaneously; said step a8 can be performed after step a5.

It should be understood that, said step a, step b and step c relate to preparation works for said subsequent steps d to g. Steps a to c can be carried out simultaneously instead of in sequential order.

In said step a5, the inner cover upper plate 22 can be welded to the upper peripheral edges of the inner cover inner enclosing component 21 first, and then the inner cover lower plate 23 is welded to the lower peripheral edges of the inner cover inner enclosing component 21. Alternatively, the order can be reversed where the inner cover lower plate 23 is welded first, and then the inner cover upper plate 22 is welded later. However, it is preferable to weld the inner cover upper plate 22 to the upper peripheral edges of the inner cover inner enclosing component 21 and the inner cover lower plate 23 to the lower peripheral edges of the inner cover inner enclosing component 21 simultaneously. Otherwise, in case of unskillful welding operation, the inner cover 2 may have imbalanced height, causing the cover to be uneven and tilted.

The first insulation material 5 in said step d and the second insulation material 25 in said step a9 can be the same kind of insulation material or different kinds of insulation materials.

With reference to FIGS. 1-4, the large size thermal bag manufactured according to the method described above comprises an outer bag 4, an inner bag 3 and a cover 100; the inner bag 3 is mounted with a lower peripheral piece 33 and an upper peripheral piece 32; the lower peripheral piece 33 is welded to the outer bag 4 to form an integral structure; a layer of first insulation material 5 is filled between the outer bag 4 and the inner bag 3; the cover 100 comprises an outer cover 1 and an inner cover 2; the inner cover 2 comprises an inner cover inner enclosing component 21, an inner cover upper plate 22, an inner cover lower plate 23, an inner cover peripheral component 24 and a layer of second insulation material 25; the inner cover lower plate 23 is a strip of material having a shape of a closed loop ring; lower peripheral edges of the inner cover inner enclosing component 21 are fixedly connected to an inner peripheral edges of the inner cover lower plate 23; lower peripheral edges of the inner cover peripheral component 24 are fixedly connected to outer peripheral edges of the inner cover lower plate 23; a lower surface of the inner cover upper plate 22 is fixedly connected to upper peripheral edges of the inner cover inner enclosing component 21, so that a middle part of the inner cover 2 has a cavity recessed inwardly towards the inner cover; the second insulation material 25 is provided between the inner cover inner enclosing component 21 and the inner cover peripheral component 24; the upper peripheral piece 32 is fixedly connected to a lower surface of the outer cover 1; upper peripheral edges of the inner cover peripheral component 24 are fixed connected to the lower surface of the outer cover 1; upper peripheral edges of the outer bag 4 are folded inwardly and downwardly to be welded to an upper surface of the outer cover 1.

In the present embodiment, the outer cover 1 comprises stacked layers from top to bottom, a first thermoplastic surface material 11, a reinforcing plate 12 and a second thermoplastic surface material 12, fixedly connected to one another; the upper peripheral piece 32 is welded to the second thermoplastic surface material 13 to form an integral structure; the upper peripheral edges of the outer bag 4 are folded inwardly and downwardly to be welded to the first thermoplastic surface material 11 to form the integral structure; the upper peripheral edges of the inner cover peripheral component 24 are welded to a lower surface of the second thermoplastic surface material 13.

Alternatively, other solutions are possible given that the entire inner cover 2 is fixedly connected to a lower end of the outer cover, for example, the upper peripheral edges of the inner cover peripheral component 24 may be fixed to the upper peripheral piece 32.

Specifically, in the present embodiment, the reinforcing plate 12 is an EVA (ethylene-vinyl acetate) plate. Also, a thickness of the EVA plate around its periphery is less than 3.0 mm. In the present embodiment, said EVA material can be placed by other materials having similar strengthening and supporting functions in the thermal bag. EVA material is mentioned only for the sake of easier understanding, and such mentioning should not constitute any limitation against other materials that can be used. Any equivalents that can simply replace the EVA material should be covered by the present invention and fall within the scope of protection of the present invention.

Embodiment 2

Figure 5:
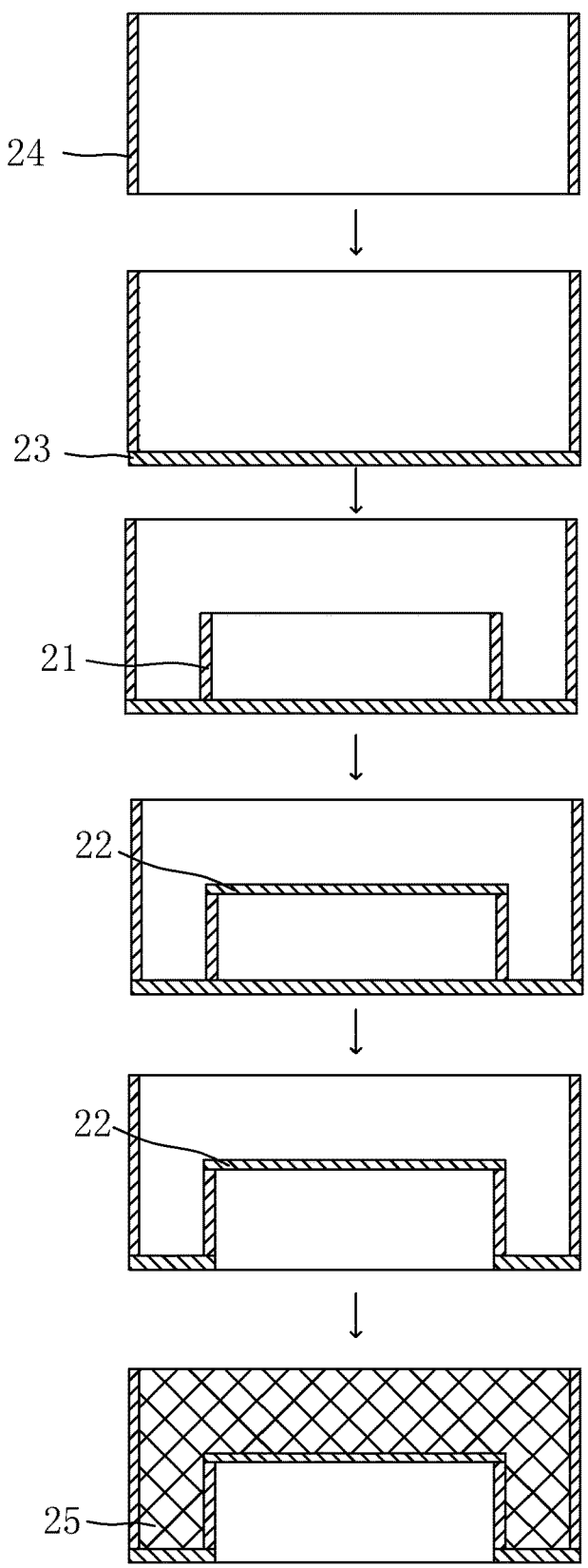
FIG. 5 is a flow chart illustrating a process of manufacturing the inner cover of the present invention according to embodiment 2 and embodiment 4.

As shown in FIG. 5, embodiment 2 is the same as embodiment 1, except for steps a4 to a9 in the manufacturing of the inner cover. In the present embodiment 2, said steps a4 to a9 of embodiment 1 are replaced by steps a10 to a16:

a10. welding two longitudinal side edges of a first rectangular thermoplastic surface material together to form an inner cover peripheral component 24;

a11. welding lower peripheral edges of the inner cover peripheral component 24 obtained in step a10 to an inner cover lower plate 23;

a12. welding two longitudinal side edges of a second rectangular thermoplastic surface material together to form an inner cover inner enclosing component 21;

a13. welding lower peripheral edges of the inner cover inner enclosing component 21 to an interior portion of the inner cover lower plate 23 of step a11 interior to a boundary of the inner cover lower plate, so that the inner cover lower plate 23 and the inner cover inner enclosing component 21 form an integral structure;

a14. welding upper peripheral edges of the inner cover inner enclosing component 21 to an inner cover upper plate 22;

a15 cutting away portions of the inner cover lower plate 23 which are interior to welding seams between the inner cover inner enclosing component 21 and the inner cover lower plate 23, so as to form a cavity 200 inwardly recessed towards the inner cover to accommodate a heating or cooling medium;

a16. after step a15, filling in a second insulation material 25 between the inner cover peripheral component 24 and the inner cover inner enclosing component 21.

Embodiment 2 is the same as embodiment 1, but the inner cover upper plate 22 and the inner cover lower plate 23 are welded to the inner cover inner enclosing component separately. As compared with embodiment 1, it is possible that embodiment 2 may cause imbalanced height of the inner cover or the outer cover, and thus causing the problem of uneven surface. Therefore, embodiment 2 requires higher precision during the manufacturing processes.

Embodiment 3

Figure 6:
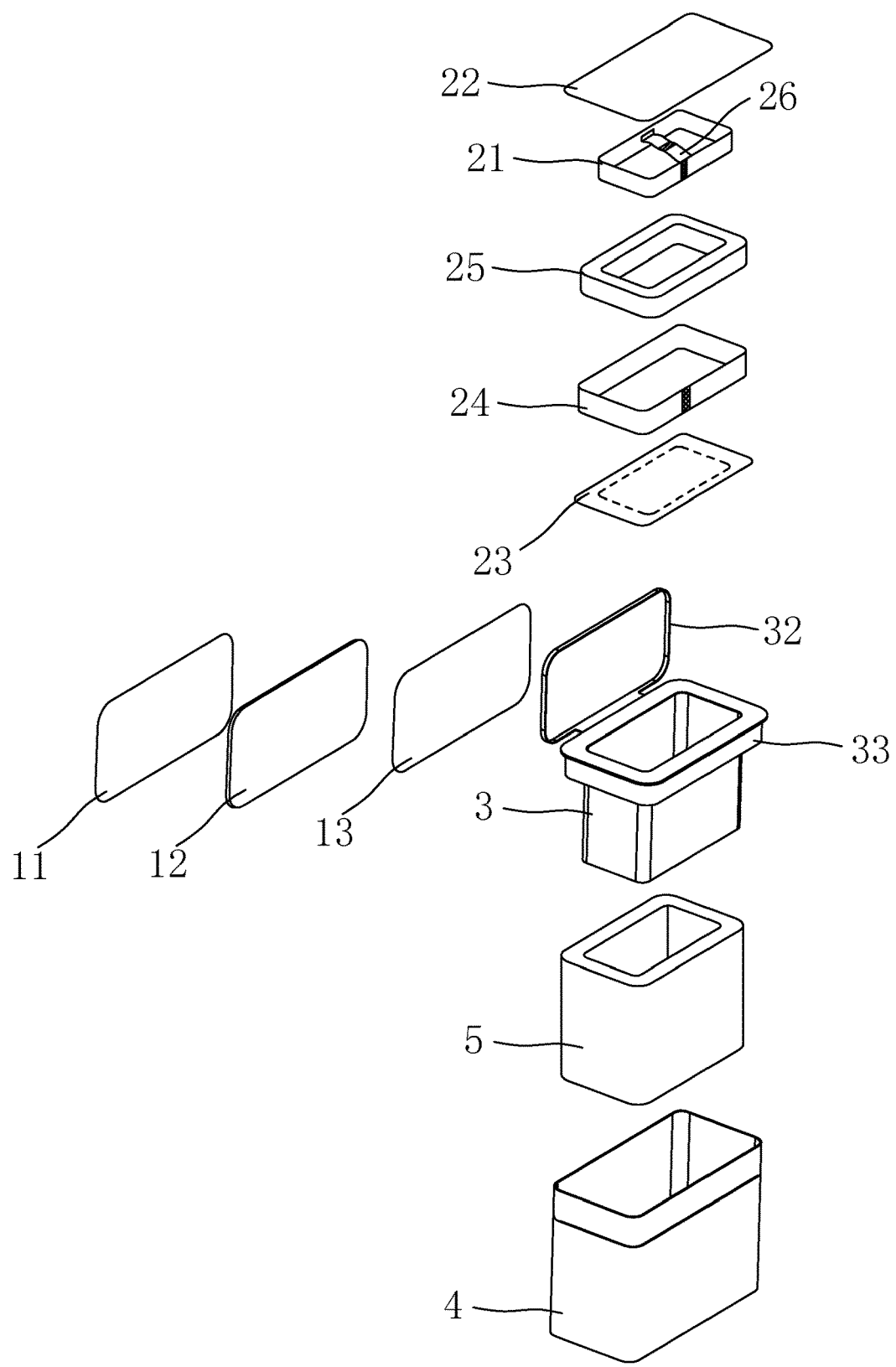
FIG. 6 is an exploded structural view of the present invention according to embodiment 3.

With reference to FIG. 6, the present embodiment provides another manufacturing method of a large size thermal bag, comprising the following steps:

a. manufacturing a cover 100 for the thermal bag, wherein the cover 100 comprises an outer cover 1 and an inner cover 2;

b. manufacturing an inner bag 3, wherein the inner bag 3 comprises an upper peripheral piece 32 above a zipper groove 31 and a lower peripheral piece 33 below the zipper groove 31;

c. manufacturing an outer bag 4;

d. disposing a layer of first insulation material 5 between the outer bag 4 and the inner bag 3; and welding upper peripheral edges of the inner bag 3 to the outer bag 4;

h. fixedly connecting inner peripheral edges of the upper peripheral piece 32 to outer peripheral edges of a second thermoplastic surface material 13;

i. fixedly connecting the outer cover 1 obtained in step a to the second thermoplastic surface material 13 of step h; wherein the outer cover 1 obtained in step a comprises a first thermoplastic surface material 11 and a EVA plate 12 fixedly connected to a bottom surface of the first thermoplastic surface material;

j. welding the outer peripheral edges of the upper peripheral piece 32 to the outer bag 4 obtained in step c to form an integral structure;

k. folding upper peripheral edges of the outer bag 4 inwardly and downwardly to be welded to outer peripheral edges of the first thermoplastic surface material 11 on an upper surface of the outer cover 1 to form an integral structure;

l. welding the inner cover 2 obtained in step a to a lower surface of the second thermoplastic surface material 13 so as to be connected integrally with the outer cover 1, thereby obtaining the thermal bag.

Figure 2:
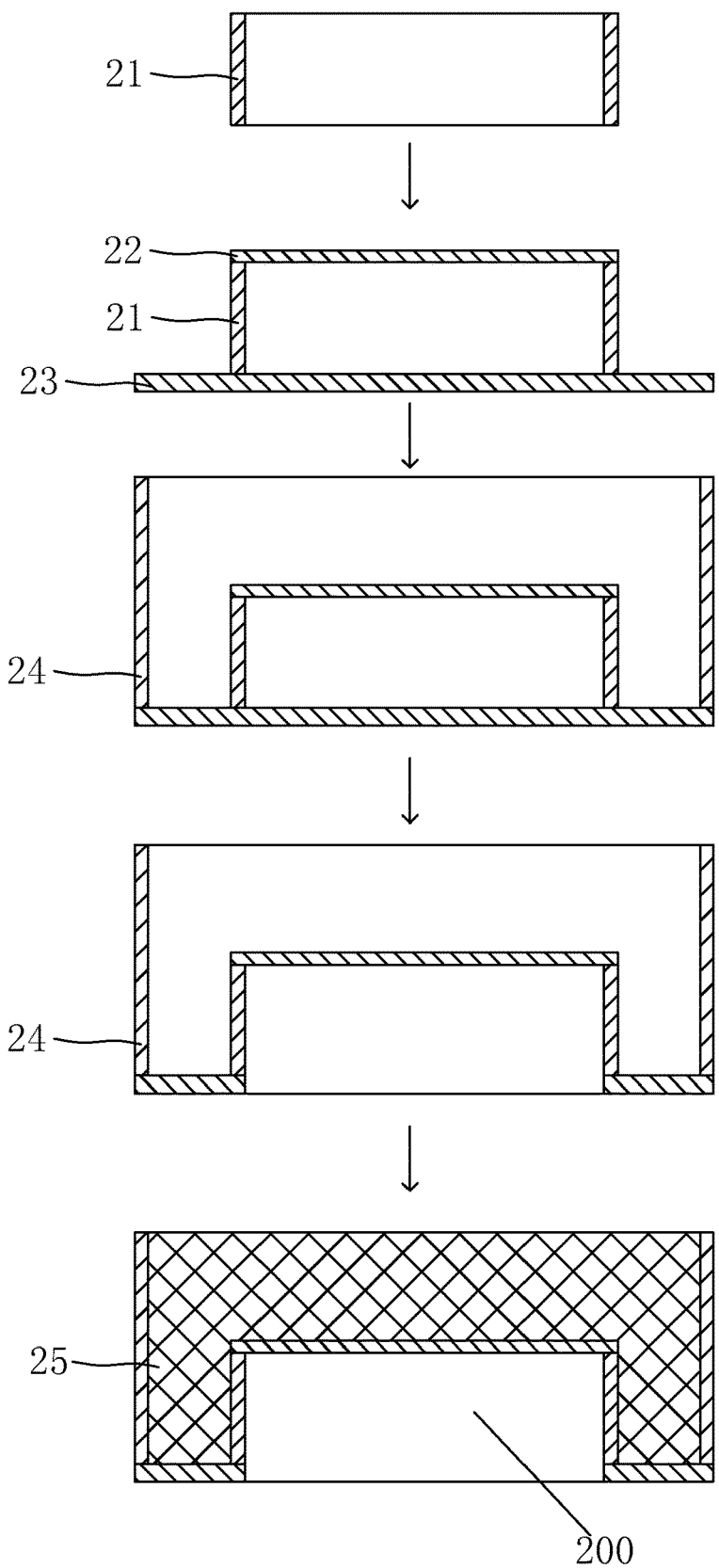
FIG. 2 is a flow chart illustrating a process of manufacturing the inner cover of the present invention according to embodiment 1 and embodiment 3.
Figure 3:
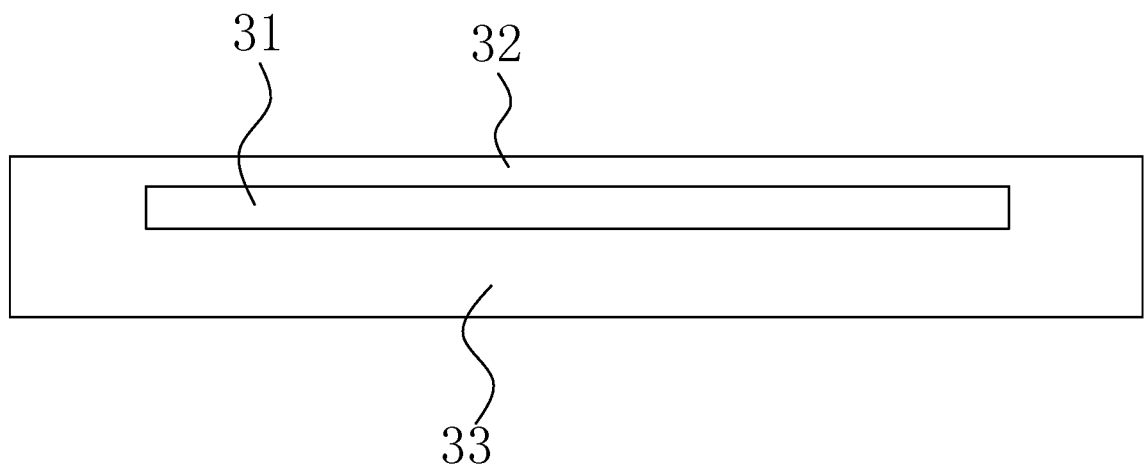
FIG. 3 is a schematic structural view showing the upper peripheral piece 32 and the lower peripheral piece 33 of the inner bag of the thermal bag in an unfolded state according to embodiment 1 of the present invention.
Figure 4:
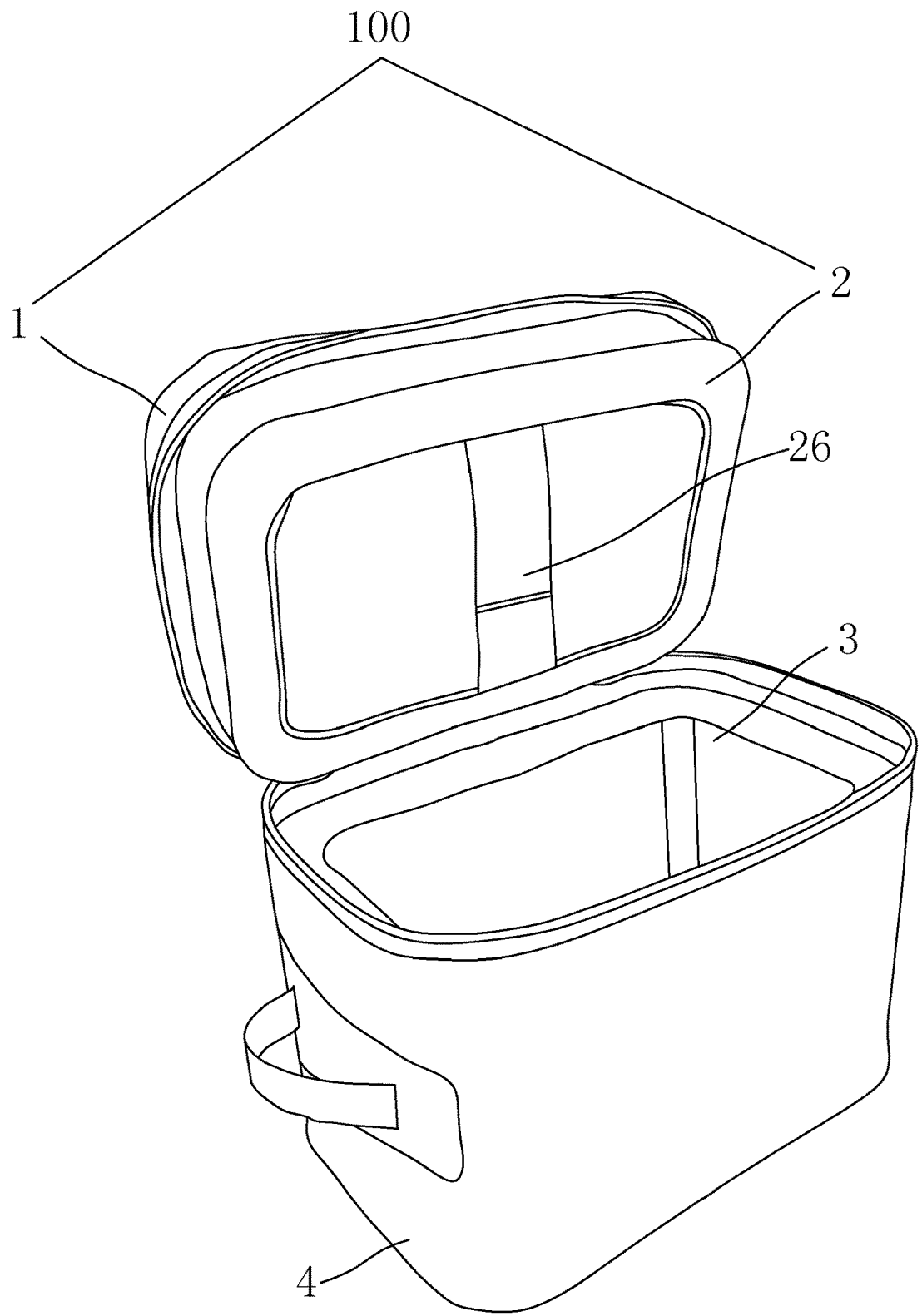
FIG. 4 is a perspective structural view of the thermal bag of the present invention according to embodiment 1.

With reference to FIG. 2, manufacturing of the inner cover 2 of the present embodiment is the same as embodiment 1. Accordingly, manufacturing of the inner cover 2 obtained in step a comprises the following steps:

a4. welding two longitudinal side edges of a first rectangular thermoplastic surface material together to form an inner cover inner enclosing component 21;

a5. welding upper peripheral edges of the inner cover inner enclosing component 21 to an inner cover upper plate 22; and welding lower peripheral edges of the inner cover inner enclosing component 21 to an inner cover lower plate 23;

a6. welding two longitudinal side edges of a second rectangular thermoplastic surface material together to form an inner cover peripheral component 24;

a7. welding lower peripheral edges of the inner cover peripheral component 24 obtained in step a6 to outer peripheral edges of the inner cover lower plate 23 to form an integral structure;

a8. cutting away portions of the inner cover lower plate 23 which are interior to welding seams between the inner cover inner enclosing component 21 and the inner cover lower plate 23, so as to form a cavity 200 inwardly recessed towards the inner cover to accommodate a heating or cooling medium;

a9. after step a8, filling in a second insulation material 25 between the inner cover peripheral component 24 and the inner cover inner enclosing component 21.

Embodiment 4

The present embodiment has the same manufacturing method of a large size thermal bag as disclosed by embodiment 3, except for the manufacturing method of the inner cover 2. The present embodiment has the same manufacturing method of the inner cover 2 as disclosed by embodiment 2, specifically illustrated in FIG. 5. Therefore, the present embodiment is the same as embodiment 3, except that said steps a4 to a9 of manufacturing the inner cover 2 obtained in step a are replaced by the following steps a10 to a16:

a10. welding two longitudinal side edges of a first rectangular thermoplastic surface material together to form an inner cover peripheral component 24;

a11. welding lower peripheral edges of the inner cover peripheral component 24 obtained in step a10 to an inner cover lower plate 23;

a12. welding two longitudinal side edges of a second rectangular thermoplastic surface material together to form an inner cover inner enclosing component 21;

a13. welding lower peripheral edges of the inner cover inner enclosing component 21 to an interior portion of the inner cover lower plate 23 of step a11 interior to a boundary of the inner cover lower plate, so that the inner cover lower plate 23 and the inner cover inner enclosing component 21 form an integral structure;

a14. welding upper peripheral edges of the inner cover inner enclosing component 21 to an inner cover upper plate 22;

a15 cutting away portions of the inner cover lower plate 23 which are interior to welding seams between the inner cover inner enclosing component 21 and the inner cover lower plate 23, so as to form a cavity 200 inwardly recessed towards the inner cover to accommodate a heating or cooling medium;

a16. after step a15, filling in a second insulation material 25 between the inner cover peripheral component 24 and the inner cover inner enclosing component 21.

Although the present invention is described and illustrated with reference to some preferred embodiments, it should be understood by a person skilled in this field of art that, any changes to the form and detail of the present invention without deviating from the scope and spirit of the present invention as limited by the appended claims should fall within the scope of protection of the present invention.

What is claimed is:

1. A thermal bag, comprising an outer bag, an inner bag and a cover; the inner bag is mounted with a lower peripheral piece and an upper peripheral piece; the lower peripheral piece is welded to the outer bag to form an integral structure; a layer of first insulation material is filled between the outer bag and the inner bag; the cover comprises an outer cover and an inner cover; the inner cover comprises an inner cover inner enclosing component, an inner cover upper plate, an inner cover lower plate, an inner cover peripheral component and a layer of second insulation material; the inner cover lower plate is a strip of material having a shape of a closed loop ring; lower peripheral edges of the inner cover inner enclosing component are fixedly connected to an inner peripheral edges of the inner cover lower plate; lower peripheral edges of the inner cover peripheral component are fixedly connected to outer peripheral edges of the inner cover lower plate; a lower surface of the inner cover upper plate is fixedly connected to upper peripheral edges of the inner cover inner enclosing component, so that a middle part of the inner cover has a cavity recessed inwardly towards the inner cover; the second insulation material is provided between the inner cover inner enclosing component and the inner cover peripheral component; the upper peripheral piece is fixedly connected to a lower surface of the outer cover; upper peripheral edges of the inner cover peripheral component are fixedly connected to a lower surface of the upper peripheral piece or the lower surface of the outer cover.

2. The thermal bag according to claim 1, wherein the outer cover comprises stacked layers from top to bottom, a first thermoplastic surface material, a reinforcing plate and a second thermoplastic surface material, fixedly connected to one another; the upper peripheral piece is welded to the second thermoplastic surface material to form an integral structure; the upper peripheral edges of the inner cover peripheral component are welded to a lower surface of the upper peripheral piece or a lower surface of the second thermoplastic surface material.

3. The thermal bag according to claim 2, wherein the reinforcing plate is an ethylene-vinyl acetate (EVA) plate; also, a thickness of the EVA plate around a periphery thereof is less than 3.0 mm.

* * * * *